April 21, 1953        J. A. BARTH        2,635,393

SURFACE CONDITIONING TOOL

Filed June 15, 1951        2 SHEETS—SHEET 1

INVENTOR.
JOHN A. BARTH
BY
Oberlin + Limbach
ATTORNEYS.

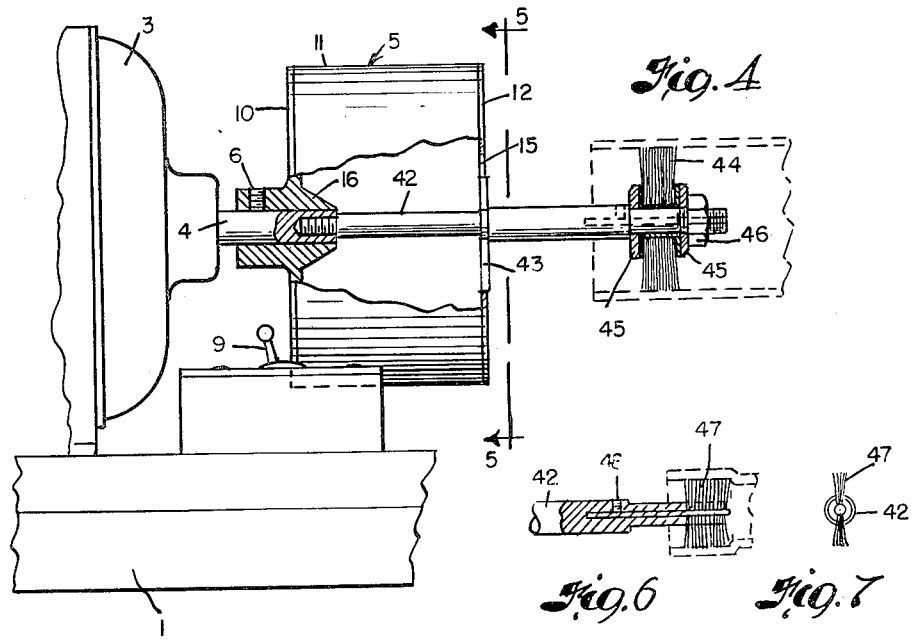
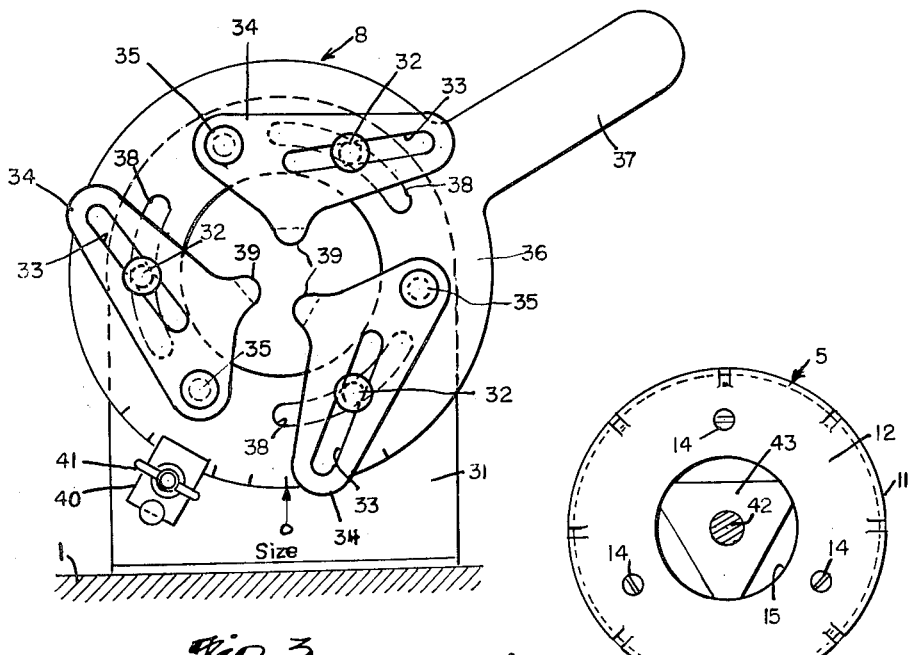

Patented Apr. 21, 1953

2,635,393

UNITED STATES PATENT OFFICE 2,635,393

SURFACE CONDITIONING TOOL

John A. Barth, Brecksville, Ohio

Application June 15, 1951, Serial No. 231,879

3 Claims. (Cl. 51—73)

The present invention relates generally as indicated to a surface conditioning tool and more particularly to a tool for thoroughly cleaning the exterior surfaces of tube or pipe end portions and the interior surfaces of tube or pipe fitting bores preparatory to soldering or similarly uniting the tubes and fittings together in telescopic relation.

In order to insure uniform flow of the bonding material such as solder, for example, in the capillary space defined between the exterior surface of a tube and the wall of the bore in a solder fitting for producing a structurally strong and fluid tight joint it is imperative that the interfitting surfaces be clean and free of dirt, grime, oil film, metal oxide, etc. Hitherto, it has been a common practice to rub the outer surface of the tube and the bore of the fitting with steel wool emery cloth, or the like, which is not only a time-consuming and painstaking operation if properly done, but the final results are dependent upon the disposition of the plumber whereby a joint formed by improperly cleaned parts, while appearing to be satisfactory and meeting initial tests, may prove to have hidden defects therein, causing failure thereof in actual use. Such possibility of failure of the joint endangers human safety, and the leakage of fluid from the joint may involve costly damage to the building structure and to the equipment therein.

Accordingly, it is one principal object of this invention to provide a surface conditioning tool which assures not only thorough cleaning of the telescoped portions of tubes and fittings which are to be soldered together, but as well a quick cleaning, taking only a few seconds.

Another object of this invention is to provide a surface conditioning tool which enables simultaneous cleaning or other conditioning of both the interior and exterior surfaces of tubular articles.

Another object of this invention is to provide a surface conditioning tool which is readily adjustable to accommodate any of a wide variety of sizes of tubes and fittings or other cylindrical or bored articles.

Another object of this invention is to provide a surface conditioning tool which is provided with a universal guide for the ends of different sizes of tubes being cleaned, which guide may be arranged to remove burrs in the ends of the tubes as caused by tube cutting tools, for example.

Another object of this invention is to provide a surface conditioning tool which is of a compact, portable nature arranged to be conveniently transported to the place where the tubes and fittings are to be joined.

Another object of this invention is to provide a surface conditioning tool in which the cleaning or conditioning elements are actuated inwardly by centrifugal force for working upon the exterior surfaces of tubes or other cylindrical workpieces.

Another object of this invention is to provide a surface conditioning tool in which the surface conditioning elements are in the form of wire or like brushes which have the effect of forming microscopic grooves in the end portion of the tube and in the bore of the fitting or other workpiece being worked upon so that the solder will wet the conditioned surfaces for uniform flow, and be firmly anchored thereto.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail one illustrative embodiment of the invention, this being indicative, however, of but one of the various ways in which the principle of the invention may be employed.

In said annexed drawings:

Fig. 3 is an end elevation view of the adjustable workpiece guide as viewed along the line 3—3, Fig. 1;

Fig. 4 is a side elevation view of the device showing the spindle and surface conditioning element thereon for operation in the bores of solder fittings, tubes, or like articles;

Fig. 5 is a transverse cross-section view taken substantially along the line 5—5, Fig. 4;

Fig. 6 is a fragmentary cross-section view of a portion of the spindle illustrated in Fig. 4 showing a different form of surface conditioning element mounted thereon;

Fig. 7 is an end elevation view of the spindle and surface conditioning element of Fig. 6 as viewed from the right-hand side.

Figure 1:
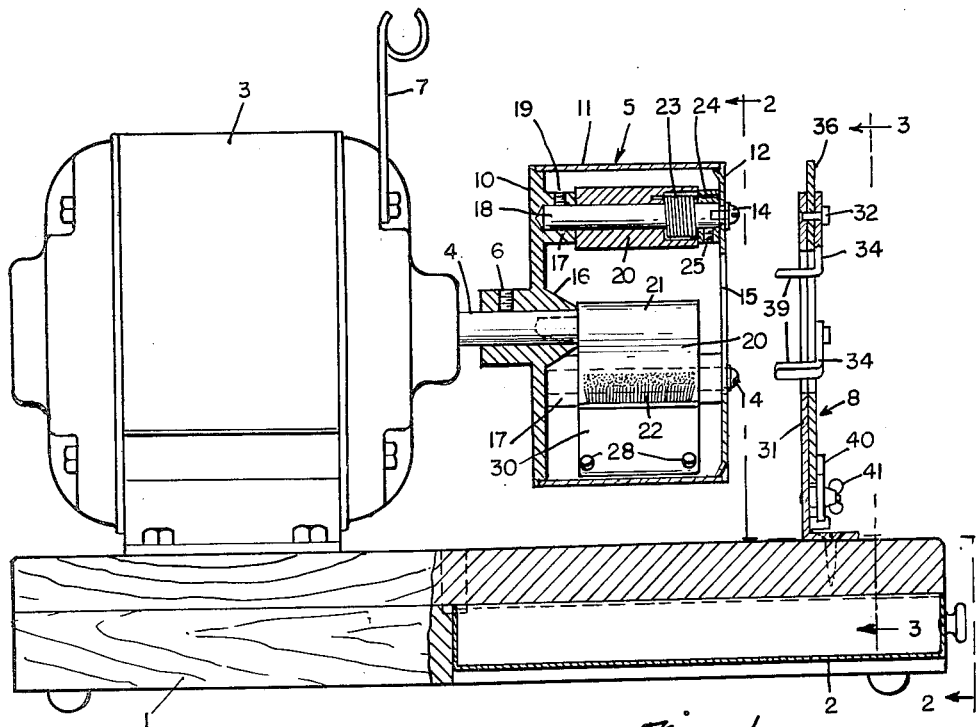
Fig. 1 is a side elevation view, partly in vertical section taken along the line 1—1, Fig. 2, of one embodiment of the present invention.
Figure 2:
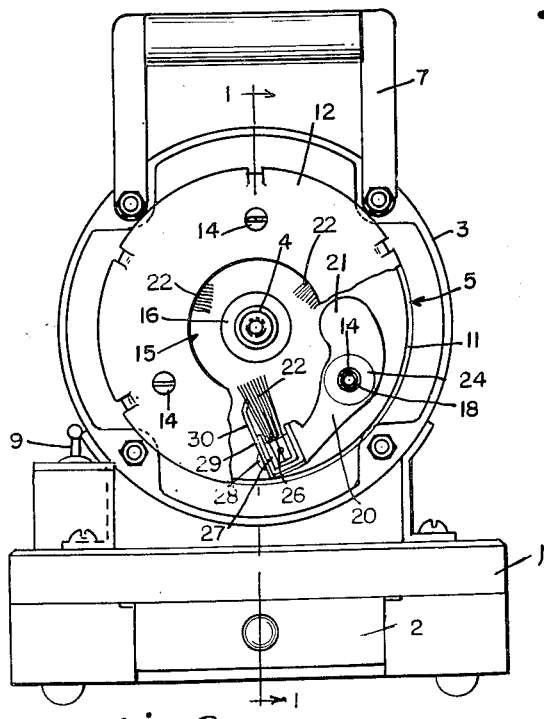
Fig. 2 is an end elevation view as viewed along the line 2—2, Fig. 1, with a portion of the cover plate of the surface conditioning device broken away in order to show one of the surface conditioning elements therein.

Referring now in detail to the drawings and first to Figs. 1 and 2, the tool as a whole comprises a base 1 having a sliding drawer 2 therein for spare parts and having mounted thereon adjacent one end an electric drive motor 3, to the drive shaft 4 of which the surface conditioning device 5 is secured by suitable means such as the set screw 6. In order to permit convenient carrying of the tool from place to place a carrying handle 7 formed from sheet metal, for example, is secured to said motor 3 as by means of the bolts which hold the motor end bells and motor frame in assembled relation. Adjacent to the other end of said base 1 and adjacent to said surface conditioning device 5 there is provided a guide unit 8, the construction of which will later be described in detail. Also mounted on said base 1 is a suitable switch 9 for energizing and deenergizing said motor 3. Obviously, an air motor or other suitable driving means may be employed instead of the electric motor 3.

The surface conditioning device 5 as herein illustrated comprises a hollow casing including an end plate 10 secured to the drive shaft 4 as aforesaid, a tubular body 11, and a cover plate 12 between which and said end plate 10 the tubular body 11 is clamped in place by screws 14 and is held centered by pilot portions formed on said plates 10 and 12, said cover plate being formed with a central opening 15 therethrough for receiving the end portion of a tube or other cylindrical article to be operated upon on its exterior surface by said device 5. Projecting centrally from said end plate 10 is a tapered or frusto-conical boss 16 which serves as a guide or centering means for the end of a tube and if desired said boss may be in the form of a burring tool or file whereby upon rotation of the casing, internal burrs at the end of the tube will be removed automatically upon positioning of the tube end against said boss.

The end plate 10 is also provided with a plurality of circularly arranged and uniformly spaced bosses 17 (herein three) adapted to have one end of the posts 18 secured therein as by means of set screws 19, said posts extending in a direction parallel to the axis of said drive shaft 4 and the axis of rotation of said device 5. As shown, the other ends of said posts are formed with reduced portions extending into openings in the cover plate and providing shoulders against which the cover plate is seated by the screws 14 which are threaded into said posts. The posts 18 are thus firmly anchored at both ends so as to be retained in parallel relation against the lateral forces applied thereon.

Oscillatorily mounted on each of said posts 18 between the ends is a lever 20 provided with a counterweight 21 and with a surface conditioning element 22 at opposite sides of the axis of the respective posts whereby, upon rotation of said device 5, the counterweights 21 will move outwardly by centrifugal force to urge the surface conditioning elements 22 inwardly into contact with the exterior surface of the tube or other cylindrical article which is to be cleaned or otherwise worked upon. In order to hold the surface conditioning elements 22 in their outer positions when the device 5 is stationary, torsion springs 23 are provided around said posts 18 each having one end fitted into a hole in the lever 20 and the other end fitted into a hole in a collar 24 rotatably adjustably secured to the respective posts as by means of set screws 25. Accordingly, as viewed in Fig. 2, the collars 24 will be rotated in a counterclockwise direction about the respective posts 18 until the springs 23 are wound up sufficiently to cause the levers 20 to engage the wall of the tubular body 11 and when said collars are thus rotated they are locked in such adjusted position by tightening the set screws 25 so as to bear against the posts.

In the present case, the surface conditioning elements 22 are in the form of wire brush strips of well known form comprising a bristle-retaining wire 26 and channel 27, said brush strips being held in place on the respective levers 20 by means of screws 28 extending through retainer members 29 and threaded into said levers 20. In order to prevent deformation of the bristles in the direction of rubbing contact with the articles worked upon, spring retainer plates 30 may be employed as shown. Although it is preferred to employ wire brushes as tube cleaning elements it will be apparent that other elements may be substituted including abrasive elements, buffing units, steel wool pads, or the like. Similarly, the bristles of the brushes may be made of any suitable material in accordance with the type of work which it is desired to perform on a workpiece. For example, in some instances it may be preferred to use brushes having bristles made of horse hair, tampico fiber, or synthetic plastic (such as nylon).

The tube or work guide 8 mounted adjacent the surface conditioning device 5, as best illustrated in Figs. 1 and 3, comprises a bracket 31 mounted on said base 1 and having a plurality of circularly arranged pins 32 projecting transversely therefrom, said pins being engaged in elongated slots 33 formed in a corresponding number of jaw members 34, said jaw members in turn being pivotally connected, as by the pins 35, to a ring-like actuating member 36 provided with a handle 37. Said actuating member 36 is disposed adjacent to the bracket 31 and is guided thereon for oscillation about the axis of the drive shaft 4 through arcuate grooves 38 fitted over the pins 32 of the bracket. The jaw members 34 are provided with workpiece engaging portions 39 which extend axially to afford stability to the workpiece against tilting relative to the axis of said device 5 and drive shaft 4. As shown in Fig. 3, the actuating member 36 and bracket 31 are formed with suitable cooperating indicia to enable quick adjustment of said guide 8 to correspond with the diameter of the tube or article to be worked upon. In order to lock said actuating member 36 in a desired position, a clamp 40 operated by the thumb screw 41 is provided on said bracket for clamping the actuating member against the bracket.

In operating the tool for cleaning the exterior surface of a tubular article, the actuating member 36 of said guide 8 is adjusted so that the jaw members 34 will engage or nearly engage the article which is inserted therethrough and through the opening 15 in the cover plate 12 with the end thereof engaged with the centering projection 16, such projection providing additional support and serving with the guide to accurately center the article within the device 5. With the article thus positioned in said device 5, the switch 9 is operated to energize the electric drive motor 3 whereupon the casing comprising plates 10 and 12 and body 11 will be rotated at high speed to cause the surface conditioning elements 22 to be moved inwardly by centrifugal force acting on the counterweighted ends of levers 20 into engagement with the exterior surface of the article and thereby removing foreign matter therefrom and as the tube or other article is withdrawn axially, the surface conditioning elements 22 will operate on the entire end portion of the article and even to a certain extent the transverse end surface hereof. The motor operating switch 9 will then be operated to deenergize motor 3 and the next succeeding tube or article inserted through the guide 8 into engagement with the tapered projection 16 in the device and the operation repeated. It is to be noted that because of the uniform spacing of the elements 22 and uniform size thereof, they will exert a uniform pressure around the article to provide a centering effect even though the article is withdrawn from engagement with projection 16.

As best shown in Fig. 4, the end of the motor drive shaft 4 is internally threaded for receiving the threaded end of a spindle 42, said spindle having secured thereon as by staking a triangular flange 43 fitting in the central opening 15 of the cover plate 12 to laterally support said spindle intermediate its ends. The reason for this particular shape of flange 43 is to permit insertion of the spindle 42 and flange 43 through the guide 8. In the form of the invention illustrated in Fig. 4, the spindle 42 has mounted thereon at its other end a cylindrical brush 44 clamped between washers 45 as by means of the nut 46 threaded onto the end of said spindle. When said spindle is rotating, the bore of a solder fitting or the interior surface of a tubular article may be worked upon by the brush 44 or other surface conditioning element.

As a modification, a twisted stem side tuft brush 47 of desired size may be mounted on the end of said spindle 42, said spindle being drilled to receive the stem of said brush and diametrically slotted at its end to provide a non-rotary connection with the brush and also to provide lateral stability to the bristles thereof. The brush 47 is held in place as by means of a set screw 48 threaded into the spindle 42 and engaged with the stem of said brush. Thus, when the spindle 42 is rotated, the bore of a fitting or other article may be quickly and efficiently cleaned or otherwise worked upon including the shoulder at the end of the bore whereby the end portion of a tube similarly cleaned may be firmly soldered in place in leak-proof relation including the cleaned juxtaposed ends of the bore and of the tube, both of which are cleaned as aforesaid.

When it is desired to remove foreign matter from or to clean or otherwise work upon both the interior and exterior surfaces of a tubular article, the spindle 42 will be threaded into the end of the drive shaft 4 and have mounted thereon a surface conditioning element such as 44 or 47 of the desired size whereby when said device 5 and spindle 42 are rotated, the surface conditioning elements 22 in said device will work upon the exterior surface of the tubular article while the surface conditioning element 44 or 47 carried by said spindle 42 will work upon the interior surface of such article.

Figure 8:
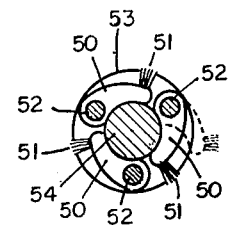
Fig. 8 is a transverse cross-section view of a modification.

As shown in Fig. 8, the device for cleaning or otherwise conditioning the bores of fittings or of tubing may comprise centrifugally outwardly actuated levers 50 carrying brush strips 51 or the like at one end and swingably mounted at the other end about pins 52, said pins being anchored in the flange 53 of a spindle 54 in circumferentially spaced relation thereabout. Said spindle 54 is adapted to be rotated about its central axis and when so rotated the levers 50 will swing outwardly about pins 52 whereby the elements 51 will work upon the interior surface of a tubular or bored article. Suitable springs 23 or the like will be employed to return the levers 50 to their inward positions upon stopping of the rotation of the spindle 54.

Other modes of applying the principle of the invention may be employed, change being made as regards the details described, provided the features stated in any of the following claims, or the equivalent of such, be employed.

I therefore particularly point out and distinctly claim as my invention:

1. A surface conditioning tool comprising a casing, a plurality of surface conditioning tools arranged in circumferentially spaced relation around a common axis and pivotally carried by said casing for centrifugal inward movement, means for rotating said casing about such axis whereby to cause inward movement of said tools into contact with the exterior surface of a tubular workpiece which is adapted to be positioned in the path of movement of said tools, springs acting on said tools to urge the latter outwardly when said casing is stationary whereby the workpiece may be readily positioned as aforesaid, and a tapered centering and burring tool carried by said casing for rotation therewith for engaging within the end of the workpiece and thereby centering the same relative to such axis and removing interior burrs therefrom while said conditioning tools are moved around in contact with the exterior surface of the workpiece.

2. A device for cleaning the exterior surface of the end portion of a tube preparatory to soldering of the same in a fitting comprising a base, a drive motor on said base provided with a drive shaft, a casing secured to said drive shaft, a plurality of levers arranged in circumferentially spaced relation around the axis of said drive shaft and carried by said casing for oscillation about axes between the ends thereof, each of said levers having a counterweight at one end thereof and a brush at the other end including bristles extending generally toward the axis of said drive shaft whereby, upon rotation of said casing, said counterweights move outwardly by centrifugal force to urge said brushes inwardly into contact with the exterior surface of a tube inserted therewithin, and springs acting on said levers to hold the latter out of contact with the tube when said casing is stationary whereby a tube may be readily inserted as aforesaid, said casing being provided with a tapered projection coaxial with said drive shaft and in the form of a burring tool which is adapted to engage within the end of the tube thereby to hold the tube in centered position when inserted as aforesaid and to remove internal burrs in the end of the tube while said brushes are moving around in contact with the exterior surface of the end portion of the tube.

3. A surface conditioning tool comprising a hollow casing formed with spaced apart ends of which one end has an opening for insertion of a workpiece into said casing, a plurality of parallel posts circumferentially spaced about such opening and having their opposite ends anchored in the ends of said casing, a corresponding number of levers oscillatorily carried on said posts between the anchored ends of the latter, said levers being provided with counterweights at one end and with surface conditioning tools at the other end whereby said counterweights are effective, under the influence of centrifugal force, to urge said tools inwardly into contact with the exterior surface of a workpiece adapted to be inserted into said casing through such opening, means for rotating said casing about an axis within and generally parallel to said posts whereby to cause inward movement of said tools as aforesaid, and springs coiled about the axes of said posts and having end portions bearing on said posts and said levers to turn the latter in a direction to move said tools outwardly when said casing is stationary whereby a workpiece may be readily inserted as aforesaid, said casing including a side wall which surrounds said posts and said tools to contain foreign matter therewithin and which constitutes a limit stop for the oscillation of said levers on said posts.

JOHN A. BARTH.

References Cited in the file of this patent

UNITED STATES PATENTS

| Number | Name | Date |
|---|---|---|
| 172,624 | Hall | Jan. 25, 1876 |
| 204,393 | Trethewey | May 28, 1878 |
| 282,364 | Pickering | July 31, 1883 |
| 323,006 | Whitney | July 28, 1885 |
| 997,167 | Werth | July 4, 1911 |
| 2,065.221 | Hellyar | Dec. 22, 1936 |
| 2,540,320 | Cayo | Feb. 6, 1951 |